Figure 1:
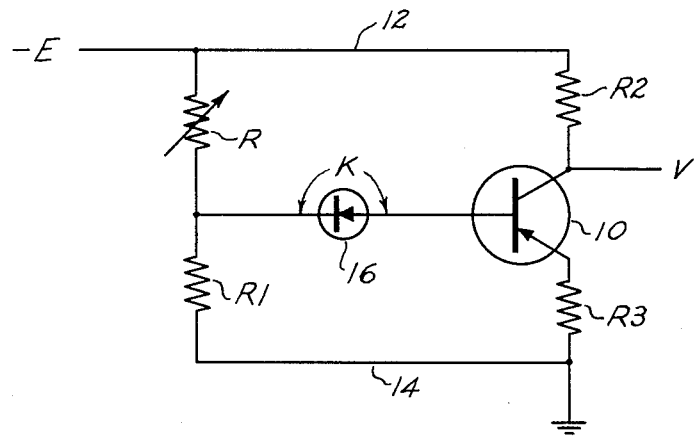

July 24, 1962 J. J. EACHUS 3,046,418

ELECTRICAL IMPEDANCE MONITORING APPARATUS

Filed Dec. 19, 1958

INVENTOR.
JOSEPH J. EACHUS
BY *Henry L. Hanson*
ATTORNEY

3,046,418
ELECTRICAL IMPEDANCE MONITORING APPARATUS

Joseph J. Eachus, Cambridge, Mass., assignor to Minneapolis-Honeywell Regulator Company, Minneapolis, Minn., a corporation of Delaware
Filed Dec. 19, 1958, Ser. No. 781,752
11 Claims. (Cl. 307—88.5)

A general object of the present invention is to provide a new and improved electrical monitoring circuit which is adapted to monitor the electrical status of a variable impedance circuit. More specifically, the present invention is concerned with a new and improved impedance monitoring circuit which is characterized by its ability to recognize impedance changes in an electrical circuit under conditions where the supply voltage for the monitor circuit may vary by a factor larger than the impedance variations in the circuit being monitored.

In certain types of electrical apparatus, it is desired that there be provided monitoring means for checking the electrical impedance conditions of an electrical network to thereby determine its operability. Such an electrical circuit might comprise a temperature-sensitive resistor used in monitoring a thermal condition in the process, or might comprise a plurality of condition-responsive resistors operating in parallel in accordance with a selective multiple function condition produced in a data processing circuit. In any event, the electrical impedance condition may be indicative of certain electrical conditions which may be considered as outside of certain accepted limits and it is desired that an indication be provided of this condition only under circumstances where it is outside of the desired limits. A known and elemental monitoring type circuit is a Wheatstone bridge wherein the circuit being monitored can be considered as one leg of the bridge. Deviations in the impedance of the leg of the bridge will be effective to create an unbalance condition which in turn can be reflected in terms of an output signal from the bridge for indicating purposes. The principal difficulty with such a Wheatstone bridge is that it requires the input voltages thereto to be maintained within fairly close limits. If it is not, the voltage on the output of the bridge will vary appreciably with input voltage and may produce a false or unwanted indication of the input impedance being outside of accepted limits.

In accordance with the principles of the present invention, a new and improved impedance monitoring network has been provided wherein the output of the network will not vary appreciably even though the supply voltage to the network varies by a factor of three to one. This new type of operation is achieved even though the impedance ratio of the circuit being monitored is intended to indicate an unwanted deviation only when the impedance ratio varies by a factor of two to one.

The objects of the invention have been achieved by a new and improved monitor circuit which incorporates a transistor connected in an impedance network in combination with a constant threshold diode which may take the form of a zener diode or a silicon diode. The constant threshold diode introduces a voltage stabilization factor in the circuit and insures that the circuit will not indicate an unwanted deviation due to wide variations in the supply voltage.

It is therefore a further more specific object of the present invention to provide a new and improved impedance circuit monitor which comprises a transistor interconnected in an electrical network with a constant threshold diode which insures that the transistor in the network is stabilized under conditions of wide variation in the supply voltage.

Still another object of the present invention is to provide a new and improved impedance monitoring circuit wherein a transistor having base, emitter, and collector terminals have a stabilizing diode connected to the base terminal thereof and the diode in turn is connected to a voltage divider which includes the variable impedance which is being monitored.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
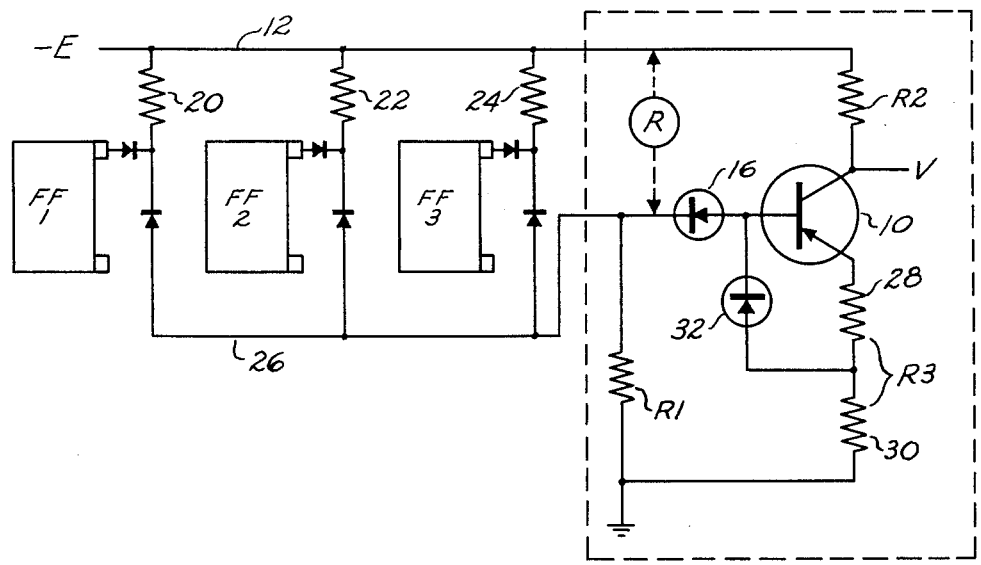

Of the drawings:

FIGURE 1 is a schematic representation of a preferred embodiment of the invention; and FIGURE 2 is a preferred form of the invention when used in a particular application in the data processing field.

Referring first to FIGURE 1, the numeral 10 identifies a transistor having the normal base, emitter, and collector terminals. The transistor 10 is coupled to a negative power supply lead 12 by way of a load resistor R2 and to a ground supply bus 14 by way of an emitter resistor R3. Connected in series between the power supply leads 12 and 14 are the resistance means R and a further resistor R1. Connected between the junction of the resistors R and R1 is a diode 16 which leads to the base terminal of the transistor 10.

The resistor R is considered in this illustrated embodiment to be the variable impedance which is being monitored by the circuit. This resistance R may comprise a thermal-type resistor, a variable potentiometer, or an apparatus of the type illustrated in FIGURE 2, wherein a plurality of resistors are adapted to be selectively connected in parallel to produce at their combined output terminals a predetermined resistance value. The diode 16 in this combination is preferably a diode having a constant threshold potential and may be a silicon diode or a zener diode. Insofar as the present circuit is concerned, over the normal range of operation, the voltage drop across the diode 16 will remain constant.

The equation for the output voltage of the circuit illustrated in FIGURE 1 may be assumed to be, using first order approximations, the following:

$$\text{Output } V = E\left[1 - \frac{R1\,R2}{R3(R+R1)}\right] + \frac{R2}{R3}K$$

In the foregoing equation, the output voltage V is the voltage that appears across the load resistor or collector resistor R2. The K in the equation is the voltage drop across the diode 16. It will also be noted in the foregoing equation that if the second term within the brackets is selected to have a value of approximately 1, the term within the brackets becomes substantially zero so that the only term remaining effective in the equation is the final term of $$\frac{R2}{R3}$$

times the constant K. In one embodiment of the invention, the operating voltage chosen for the value E was six volts. It was found that over the range of three volts to nine volts, the output voltage remained substantially constant. This assumes, however, that the value of the resistor R is within the limits that have been established for the system. As soon as the resistance of the resistor R goes outside of the predetermined limits, the second term within the brackets in the above equation becomes appreciable and the output voltage will no longer remain constant. When there is a predetermined deviation from the constant output voltage, suitable sensing means, not shown, will detect this and an appropriate indication may be made.

In the preferred embodiment, as illustrated, the magnitudes and types of components used in the circuit were as follows:

$R$=variable
    $2000\Omega$=OK
    $1000\Omega$=Error
$R1=330\Omega$
$R2=1000\Omega$
$R3=130\Omega$
Transistor=2N427
Diode=SG22

By substituting the values from the above table in the foregoing equation, it will be noted that when the variable R is $2000\Omega$, the output of the indication circuit will show that the magnitude of the resistor R is within proper bounds. However, if the magnitude of the resistance R becomes $1000\Omega$, or less, the output voltage becomes appreciable and there will be a substantial deviation from the constant voltage in the circuit to thereby indicate that there is an error or that the resistance has passed outside of limits. When the magnitude of the resistor R is within accepted limits, the voltage V will remain substantially constant. When the magnitude of the resistor R decreases, the transistor 10 is biased into a saturated state where the emitter and collector voltages are substantially equal. The output voltage V then becomes a direct function of the magnitude of the resistors R2 and R3 so that at this point, the foregoing formula no longer holds. Thus, the voltage V will be smaller in magnitude or less negative than when the resistor R is within its normal range.

The circuit of FIGURE 2 has been devised for monitoring the operative state of a series of flip-flops which may be, for example, associated with electronic data processing apparatus. It is assumed that, with the circuitry illustrated in FIGURE 2, if none or one of the flip-flops is operative, the circuit operation is correct. However, if two or more of the flip-flops are operative at the same time, the circuit should indicate the presence of an error. The circuit is illustrated with three flip-flops, FF1, FF2 and FF3. In one embodiment of the invention, twenty flip-flops were monitored by a circuit of the type illustrated. Each of the flip-flops FF1 through FF3 has an output resistor 20, 22, and 24. Gating diodes are shown coupling the outputs of the respective flip-flops to the respective resistors so that if any particular flip-flop is operative in a predetermined state, the associated output resistor will be effectively coupled between the power supply lead 12 and the input lead 26. It will be apparent that if two of the flip-flops are operative at the same time, the resistors associated therewith will be coupled in parallel between the two lines 12 and 26 so that their effective resistance will be half that of either of the individual resistors. The remaining portion of the circuitry illustrated in FIGURE 2 is basically the same as that of FIGURE 1 and carries the same reference characters. The resistor R3 in FIGURE 2 is divided into two sections, 28 and 30, with the junction point for these two resistors being coupled to a further diode 32. The diode 32 is connected to the base terminal of the transistor 10. This latter circuit is provided during startup intervals when it is possible that two or more flip-flops may be on initially until all the circuits have been reset and established to their normal operating state. Diode 32 provides a bypass around the emitter-base circuit of the transistor 10 to thereby prevent the overloading of this transistor. Once the circuit is operating normally, the diode 32 will not appreciably affect the operation of the transistor 10.

Once the circuit is operating properly, it is assumed that no more than one of the flip-flops FF1 through FF3 will be on at any one particular instance. When one of the flip-flops is on, the effective resistance R reflected into the monitor circuit must be of a value to substantially eliminate that portion of the equation set forth above that is inside of the brackets. If the values are as assumed in the above table, the reflected resistance to the input of the monitor circuit will be approximately $2000\Omega$. If two or more flip-flops should come on at the same time, the magnitude of the resistance R will decrease and there will be a resultant output signal from the transistor 10 which will be effective in any indicating circuitry associated therewith.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure Letters Patent is:

1. A variable impedance monitor circuit comprising a pair of power supply terminals, a first series circuit connected between said pair of supply terminals and comprising a pair of series connected impedance circuits, one of which is variable, a transistor having base, emitter, and collector terminals, a first resistor connecting said collector terminal to one of said supply terminals, a second resistor connecting said emitter terminal to the other of said supply terminals, the voltage on said emitter terminal being substantially entirely a function of the emitter-collector current flowing in said second resistor, and a diode connecting said base terminal to the junction of said pair of impedance circuits.

2. A variable impedance monitor circuit comprising a pair of power supply terminals, a first series circuit connected between said pair of supply terminals and comprising a pair of series connected impedance circuits, one of which is variable, a transistor having base, emitter, and collector terminals, a first resistor connecting said collector terminal to one of said suuply terminals, a second resistor connecting said emitter terminal to the other of said supply terminals, the voltage on said emitter terminal being substantially entirely a function of the emitter-collector current flowing in said second transistor, and a diode connecting said base terminal to the junction of said pair of impedance circuits, said diode having a constant voltage drop thereacross.

3. A variable impedance monitor circuit comprising a pair of power supply terminals, a first series circuit connected between said pair of supply terminals and comprising a pair of series connected impedance circuits, one of which is variable, a transistor having base, emitter, and colector terminals, a first resistor connecting said collector terminal to one of said supply terminals, a second resistor connecting said emitter terminal to the other of said supply terminals, the voltage on said emitter terminal being substantially entirely a function of the emitter-collector current flowing in said second transistor, and a zener diode connecting said base terminal to the junction of said pair of impedance circuits.

4. In combination, a series circuit comprising a first and second resistance means, a transistor having base, emitter and collector terminals, a pair of power supply terminals coupled to said first and second resistance means respectively, a third resistor, means including said third resistor connecting said collector terminal to one of said power supply terminals, a fourth resistor, means including said fourth resistor connecting said emitter terminal to the other of said power supply terminals, the voltage on said emitter terminal being substantially entirely a function of the emitter-collector current flowing in said fourth resistor, and a constant voltage device connecting said base terminal to the junction of said first and second resistance means.

5. In combination, a series circuit comprising a first and second resistance means, a transistor having base, emitter and collector terminals, a pair of power supply terminals coupled to said first and second resistance means respectively, a third resistor, means including said third resistor connecting said collector terminal to one of said power supply terminals, a fourth resistor, means including said fourth resistor connecting said emitter terminal to the other of said power supply terminals, the voltage on said emitter terminal being substantially entirely a function of the emitter-collector current flowing in said fourth resistor and a constant voltage device connecting said base terminal to the junction of said first and second resistance means, said constant voltage device comprising a semiconductor diode.

6. In combination, a series circuit comprising first and second resistors, a transistor having base, emitter and collector terminals, a pair of power supply terminals coupled to said first and second resistors respectively, a third resistor, means including said third resistor connecting said collector terminal to one of said power supply terminals, a fourth resistor, means including said fourth resistor connecting said emitter terminal to the other of said power supply terminals, the voltage on said emitter terminal being substantially entirely a function of the emitter-collector current flowing in said fourth resistor, and a constant voltage device connecting said base terminal to the junction of said first and second resistors.

7. Apparatus for checking the operative state of a plurality of electrical circuits comprising a separate resistor connected to each of said electrical circuits to be checked, a pair of output terminals connected to all of the separate resistors and adapted to have a terminal resistance dependent on the number of separate resistors coupled thereto by the associated operative circuits, a bias resistor coupled to a reference point, a transistor having base, emitter, and collector terminals, a first diode coupling said base to said bias resistor and to one of said output terminals, a load resistor connected between said collector terminal and the other one of said output terminals, a further resistance means connected between said emitter terminal and said reference point, and a second diode connected between said base terminal and said further resistance means to limit the current in said transistor between said emitter and base terminals.

8. An impedance network comprising a pair of power supply terminals, a transistor having base, emitter, and collector terminals, a first pair of resistance means connected in series between said pair of power supply terminals, a second pair of resistance means connected one each to each of said power supply terminals, means including the emitter-collector terminal path of said transistor connecting said second pair of resistance means in a series circuit, the voltage on said emitter terminal being substantially entirely a function of the emitter-collector current, and a constant threshold diode connecting said base terminal to the junction of said first pair of resistance means.

9. An impedance network comprising a pair of power supply terminals, a transistor having base, emitter, and collector terminals, a first pair of resistance means connected in series between said pair of power supply terminals, a second pair of resistance means connected one each to each of said power supply terminals, means including the emitter-collector terminal path of said transistor connecting said second pair of resistance means in a series circuit, the voltage on said emitter terminal being substantially entirely a function of the emittter-collector current, and a silicon diode connecting said base terminal to the junction of said first pair of resistance means.

10. An impedance network comprising a pair of power supply teminals, a transistor having base, emitter, and collector terminals, a first pair of resistance means connected in series between said pair of power supply terminals, a second pair of resistance means connected one each to each of said power supply terminals, means including the emitter-collector terminal path of said transistor connecting said second pair of resistance means in a series circuit, the voltage on said emitter terminal being substantially entirely a function of the emitter-collector current, and a zener diode connecting said base terminal to the junction of said first pair of resistance means.

11. Apparatus for checking the operative state of a plurality of electrical circuits each of which is adapted to present an operating resistance between a pair of circuit terminals, comprising a pair of output terminals, means connecting said pairs of circuit terminals between said output terminals to provide a total operating resistance dependent on the number of individual operating resistances coupled between said output terminals, a bias resistor coupled to a reference point, a transistor having base, emitter, and collector terminals, a first diode coupling said base to said bias resistor and to one of said output terminals, a load resistor connected between said collector terminal and the other one of said output terminals, a further resistance means connected between said emitter terminal and said reference point, and a second diode connected between said base terminal and said further resistance means to limit the current in said transistor between said emitter and base terminals.

References Cited in the file of this patent

UNITED STATES PATENTS

| | | |
|---|---|---|
| 2,714,702 | Shockley | Aug. 2, 1955 |
| 2,716,729 | Shockley | Aug. 30, 1955 |
| 2,859,402 | Schaeve | Nov. 4, 1958 |
| 2,901,740 | Cutsogeorge | Aug. 25, 1959 |
| 2,913,599 | Benton | Nov. 17, 1959 |